(12) United States Patent
Sakamoto

(10) Patent No.: US 8,549,425 B2
(45) Date of Patent: Oct. 1, 2013

(54) VISUAL TREATMENT FOR A USER INTERFACE IN A CONTENT INTEGRATION FRAMEWORK

(75) Inventor: Manabu Sakamoto, Tokyo (JP)

(73) Assignees: Sony Corporation, Tokyo (JP); Sony Corporation of America, New York, NY (US)

( * ) Notice: Subject to any disclaimer, the term of this patent is extended or adjusted under 35 U.S.C. 154(b) by 315 days.

(21) Appl. No.: 12/959,196

(22) Filed: Dec. 2, 2010

(65) Prior Publication Data

US 2012/0139932 A1    Jun. 7, 2012

(51) Int. Cl.
*G06F 3/048* (2013.01)

(52) U.S. Cl.
USPC ........... 715/781; 715/764; 715/769; 715/810; 353/30; 382/295; 726/4

(58) Field of Classification Search
USPC ....................................................... 715/781
See application file for complete search history.

(56) References Cited

U.S. PATENT DOCUMENTS

| | | | |
|---|---|---|---|
| 7,234,114 B2* | 6/2007 | Kurtz et al. ............... | 715/746 |
| 2006/0253782 A1* | 11/2006 | Stark et al. ............... | 715/727 |
| 2007/0011702 A1* | 1/2007 | Vaysman ................... | 725/45 |
| 2009/0169132 A1* | 7/2009 | Sagawa ..................... | 382/295 |
| 2010/0095219 A1* | 4/2010 | Stachowiak et al. ...... | 715/745 |
| 2010/0122196 A1* | 5/2010 | Wetzer et al. .............. | 715/769 |
| 2010/0185965 A1* | 7/2010 | Davidson et al. .......... | 715/765 |
| 2011/0126148 A1* | 5/2011 | Krishnaraj et al. ........ | 715/784 |
| 2011/0252460 A1* | 10/2011 | Wetzer et al. .............. | 726/4 |
| 2012/0096393 A1* | 4/2012 | Shim et al. ................ | 715/784 |
| 2012/0099081 A1* | 4/2012 | Huang et al. .............. | 353/30 |
| 2012/0216117 A1* | 8/2012 | Arriola et al. ............. | 715/716 |

OTHER PUBLICATIONS

Screenshot of Mac OS X Leopard, released on Oct. 26, 2007, available online at [http://en.wikipedia.org/wiki/Mac_OS_X_Leopard], 1 page.*

Features of Cooliris 1.12, manufactured by Cooliris, Inc, published on Aug. 26, 2010, 8 pages.*

(Continued)

*Primary Examiner* — William Bashore
*Assistant Examiner* — Reza Nabi
(74) *Attorney, Agent, or Firm* — Trellis IP Law Group, PC

(57) ABSTRACT

In a method, system, and computer-readable medium having instructions for a visual treatment for a user interface in a content integration framework, information is received on a tile size for a matrix of tiles and the matrix has one or more tiles with the tile size displayed on a user interface, one or more content images is received for display on the user interface, a position is determined within a first tile of the matrix for rendering a first content image from the one or more content images, a first area of excess space is determined within the tile after positioning the first content image within the first tile and the first area of excess space is dependent on at least one of an aspect ratio of the first content image and a size of the first content image, a reflection of the first content image is rendered within at least a portion of the first area of excess space within the first tile, the first content image is rendered within the first tile of the matrix, and descriptive text associated with the first content image is displayed so that the descriptive text overlays the reflection and not the first content image.

20 Claims, 13 Drawing Sheets

(56) References Cited

OTHER PUBLICATIONS

Screenshot of Mac OS X Leopard, released on Oct. 26, 2007, available online at [http://en.wikipedia.org/wiki/Mac OS X Leopard], 1 page.*
"Image Reflections with CSS", by David Walsh, published on Aug. 19, 2010, 3 pages.*
Reeslseo, Mark R. Robertson; "Everyzing Introduced Revolutionary Online Video Player—Meta Player" Oct. 22, 2008—http://www.realseo.com/everyzing-introduces-revolutional-online-video-player-metaplayer/.
Anonymous: "How to Preview and Sort 2000 Images Fast", Nov. 26, 2010, pp. 1-5, SP55015819, Retrieved from the internet: URL: http ://web, archive. org/web/20101126062004/ http: //macperformanceguide.com//OptimizingImagePreview. html [retrieved on Jan. 6, 2012].
Anonymous: "Cooliris 1.11", Nov. 21, 2010, pp. 14. XP55015846, Retrieved from the Internet: URL : http://webarchive.org/web/20101121174633/http://digiretuscom/dosszie/cikkiro.php?SORSZAM=191&PHPSESSID=9f1917b90106c9d52f8d7i44afa5e201 [retrieved on Jan. 6, 2012].
Frank Puhlmann: "iLife", Oct. 4, 2007, pp. 1-4, XP55015792. Retrieved from the Internet: URL: http://blog.frapu.de/index.php?dm04&m=10&y= 07 [retrieved on Jan. 5, 2012].
Scott Meyers and Mike Lee: "Mac OS X 441 Leopard: Beyond the Manual", Jan. 1, 2008. pp. 1-2, IV,V,VII, XP002634446, ISBN: 1-59059-837-7.
Rick Lepage: "First Look: First Look: 115 iPhoto 08". Apr. 13, 2007, pp. 1-7, XP55015849 Retrieved from the Internet: URL : https://www.macworld.com/article/59441/2007/08/fliphoto.html [retrieved on Jan. 6, 2012].

* cited by examiner

VISUAL TREATMENT FOR A USER INTERFACE IN A CONTENT INTEGRATION FRAMEWORK

BACKGROUND

Approaches to aggregating content include requiring a contributor to conform the organization of their content into a single organizational structure adopted by the developer of the software aggregating all of the content. Often each contributor of content must conform each of their organizational structures (e.g. hierarchical) of content to fit into another hierarchical structure and conform their content (e.g. image files) to fit into another user interface. For example, contributors may have to alter their organizational structure to fit into the structure offered and presented by the software aggregating the content.

Unfortunately, the contributors may also have to alter images to fit within the user interface provided by the software that aggregates the content. For example, the contributors may have to determine what portion of an image to discard by cropping or distort their images in order to fit their image within the user interface of software that aggregates content.

SUMMARY

In a method, system, and computer-readable medium having instructions for a visual treatment for a user interface in a content integration framework, information is received on a tile size for a matrix of tiles and the matrix has one or more tiles with the tile size displayed on a user interface, one or more content images is received for display on the user interface, a position is determined within a first tile of the matrix for rendering a first content image from the one or more content images, a first area of excess space is determined within the tile after positioning the first content image within the first tile and the first area of excess space is dependent on at least one of an aspect ratio of the first content image and a size of the first content image, a reflection of the first content image is rendered within at least a portion of the first area of excess space within the first tile, the first content image is rendered within the first tile of the matrix, and descriptive text associated with the first content image is displayed so that the descriptive text overlays the reflection and not the first content image.

A further understanding of the nature and the advantages of particular embodiments disclosed herein may be realized by reference of the remaining portions of the specification and the attached drawings.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION OF EMBODIMENTS

Figure 1A:
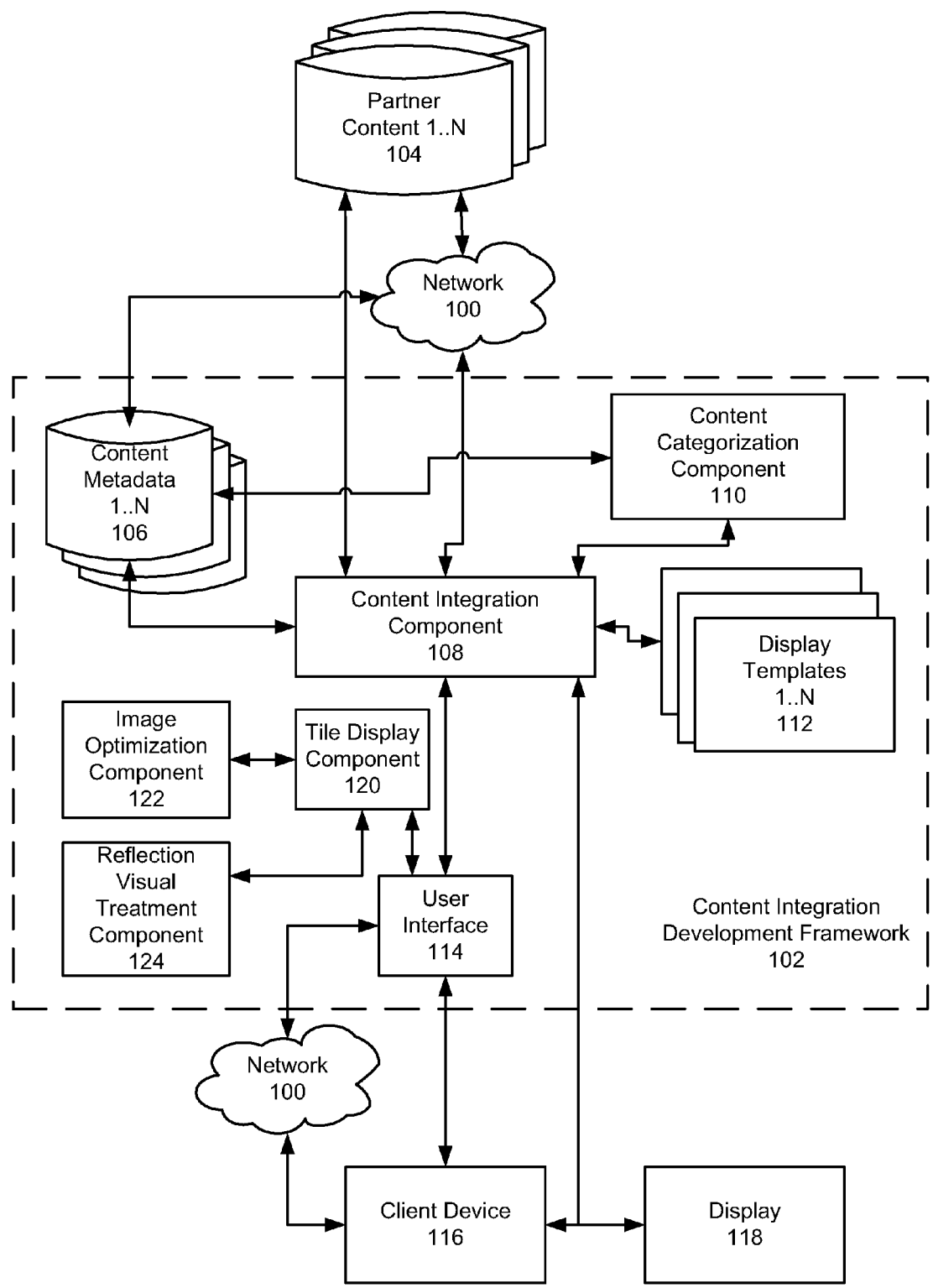
FIG. 1A illustrates a block diagram of an example of a system for an implementation of a content integration development framework.

Systems, methods, apparatuses, computer readable mediums, and computer program products are provided for integrating content. Embodiments of the present invention provide a framework or an infrastructure that allows for the development of software applications that integrate content from one or more content sources, partners, and/or content providers. The content that is integrated with the framework may be from a third party and/or may be viewed as content from a partner in content integration. It may be desirable to have an approach to integrate content that provides for a consistent and/or uniform interface for all content with a generally consistent experience for a user and an improved visual experience for discovery of content.

A consistent, uniform user interface for discovery of content may be preferable even when content providers provide content images that have varying sizes and aspect ratios. It may be desirable to present this uniform user interface with limited cropping and limited overall distortion of the original images provided by partners when integrating content. In one or more embodiments, a visual treatment may be applied to images that may be received in various sizes and aspect ratios in order to present a uniform display of content on the user interface. For example, a reflection visual treatment may be applied to an area of excess space in a tile to ensure that an image (e.g. an image representing discoverable content) is of a similar size or nearly similar size as other images displayed on a page.

Embodiments may apply a visual treatment within one or more tiles of a matrix of tiles in a tile display rendered on a user interface to ensure that a matrix is displayed with a consistent or nearly consistent tile size. A matrix is a set of tiles displayed on a user interface in rows and columns. The matrix may have evenly spaced tiles displayed on the user interface and may have the appearance similar to a grid. The content images of the tile display may be arranged in a matrix that has horizontal rows and vertical columns of tiles, and each tile may have a uniform or nearly uniform square shape and size. The content images may be displayed within the tiles of the matrix. For example, a 1×4 matrix of tiles may have one row and four columns of tiles with images and a 1×1 matrix may have one tile.

Additionally, it may be desirable for the uniform user interface to offer flexibility in customizing the user interface and navigation experience for each the partner. For example, a software application developed with an embodiment of the content integration framework may allow for navigation from Sony® content to YouTube® content with the use of a common, uniform, and/or consistent interface, but the partner may control and/or customize the discovery and navigation experience with their content and related content.

In a preferred embodiment, the integration of content with the content development framework may allow the user to flow through content to discover content easily. The content integration framework may facilitate the discovery of content or ability to find content without requiring the partner to conform the organization of their content into another organizational structure. For example, the partner may not be forced to conform or fit their hierarchical structure or organizational structure for their content and/or data for their content to fit into another hierarchy. The metadata for content from one or more partners and/or alternate sources may indicate the organization of content for integration with the content integration framework.

Embodiments may use templates to allow for customization of the user interface by the partner. The partner may make their content and/or metadata for their content accessible to the framework in order to integrate their content with the content from other partners. The partner may then customize the user experience for navigating their content and related content with templates. In one or more embodiments, the template may be used to specify that a tile display be used for displaying the related content.

As used herein, the terms "partner" and "content provider" are used broadly to describe an individual, a group of users, a group of individuals, a content source, and/or an administrator with content to integrate using the framework. Although a user interface is described throughout for a preferred embodiment of content integration, those skilled in the art will recognize that the user interface may be used with many approaches for integrating content, such as other approaches to content integration that require a partner to conform their content and hierarchy to a particular organization structure adopted and provided by the content integration software.

FIG. 1A illustrates a block diagram of an example of a system for an implementation of a content integration development framework. A network 100 is an infrastructure for sending and receiving signals and messages according to one or more designated formats, standards, or protocols. A Network 100 may provide for both wired and wireless communication between the various elements of FIG. 1. Embodiments may rely on a Network 100 for communication between elements of an implementation of a Content Integration Development Framework 102 as depicted, including, but not limited to, database(s) of Partner Content 1 . . . N 104, database(s) of Content Metadata 1 . . . N 106, a Content Integration Component 108, a Content Categorization Component 110, any number of Display Template(s) 1 . . . N 112, a User Interface 114, and a Client Device 116.

Any number of networks and service providers may be used to facilitate communication between the elements of FIG. 1. Examples of available implementations for a network 100 may include, but are not limited to, satellite, WiFi, WiMAX, global systems for mobile (GSM), time division multiple access (TDMA), code division multiple access (CDMA) wireless networks, and/or hardwired connections, such as fiber optics, T1, cable, DSL, high speed trunks, and public switched telephone network (pSTN) lines. Various protocols may be employed to allow for communication between the elements, such as TDMA, CDMA, GSM, personal communications systems (PCS), WiFi, WLAN, WiMAX, Hyper Text Transfer Protocol (HTTP), internet protocol suites (e.g., Transmission Control Protocol (TCP) and the Internet Protocol (IP)), Voice-over-Internet protocol (VoIP) or any other voice and/or data communications protocols and standards.

The Network 100 may provide for the Content Integration Component 108 to retrieve content from Partner Content 1 . . . N 104 database(s). Partner Content 104 database(s) may be locally stored on a computer system with an application developed with the Content Integration Development Framework 102 and/or Partner Content 104 database(s) may be remote to the application developed with the Content Integration Development Framework 102. The Content Integration Component 108 may have access to addresses and/or identifiers that allow for the retrieval of content from a Partner Content 104 database. Alternatively, the Content Integration Component 108 may be able to query Partner Content 104 database(s) to retrieve content. In a preferred embodiment, the Content Integration Component 108 may have an address, identifier, and/or uniform resource locator (URL) for content integrated with the Content Integration Development Framework 102, and may provide the address, identifier and/or url for retrieval of content.

Implementations of a database may include, but is not limited to, the following: relational database(s), object-oriented database(s), file system(s) and/or any other collection of data. The content stored in database(s) may include, but is not limited to, the following: metadata, images, video, audio, text, and/or any other type of data. For example, "Partner Content 1" database may have content and images that represent content accessible on YouTube©, "Partner Content 2" database may have content and images that represent content accessible on TED©, and "Partner Content 3" database may have Sony content and images that represent the content.

Metadata associated with the content integrated with the Content Development Framework 102 may be stored at a database for Content Metadata 1 . . . N 106. Metadata may be provided that describes each piece of content in the Partner Content 1 . . . N 104 database(s). Metadata may be provided by a partner and/or content provider of the Partner Content 1 . . . N 104 and alternate sources. The metadata from the partner may not have to conform or be adapted from their existing infrastructure, organization, and/or metadata to fit in with another hierarchy/organization in order to be integrated using the framework in a preferred embodiment. The metadata may be used to apply a technique to organize the content for browsing and to allow a user to discover related content (content discovery). In one or more embodiments, the partner may indicate the structure of their database with an XML file and the Content Integration Component 108 may query the Partner Content 1 . . . N 104 databases to retrieve the metadata.

The metadata may describe the content in a variety of ways that include, but are not limited to, the following: keywords, organization in a hierarchy, organization by partner, synopsis of content, lyrics, images, relationships to other content, related content, and/or text. The metadata provided by the partner may indicate the hierarchical structure of organization of the content at the Partner Content 1 . . . N 104 database. The content may be organized by the partner in a variety of ways, such as, in a tree structure, alphabetically, by genre, and/or any other type of organization. For example, the content may be organized by a partner in a tree structure:

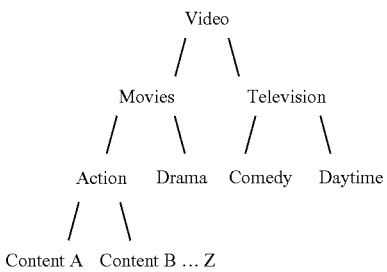

In the example, metadata indicates an organization of a tree structure by type (e.g., "video"), genre (e.g., "movies", "television", "action", "drama", "comedy", and "daytime") and alphabetically (e.g., "content A", "content B" . . . "content Z"). In another example, a collaborative filter may be used to identify relationships with content. A collaborative filter establish relationships between content when a user selects content (e.g., a plurality of users that chose "Content A" also chose "Content B" and the content is deemed related) and the relationships may be indicated in the metadata from the partner.

Metadata may also be provided by a third-party and/or an alternate source or service for any of the content in Partner Content 1 . . . N 104 database(s). In a preferred embodiment, Gracenote® and sites or sources that provide reviews on content may be used as a reference and/or alternate source for metadata for content and may be relied upon to categorize content. The metadata may change over time and the changes may be captured by consistently retrieving updated metadata. The changes may be reflected both in the designation of categories for a piece of content and the particular content placed in categories.

The Content Categorization Component 110 may be used by the Content Integration Component 108 to categorize and/or organize related content. The Content Categorization Component 110 may use the metadata in the database(s) of Content Metadata 1 . . . N 106 to determine an organization for the content. The Content Categorization Component 110 may organize content by grouping related content to a selected content in "pivots" for display on the User Interface 114. For example, with a selected content of a cartoon movie the related content may be grouped in pivots on the user interface, such as "deep water" and "fish" in accordance with the metadata for the content. The grouping of the related content in pivots in accordance with metadata may be different from the hierarchical organization provided by the partner. In the example, the cartoon movie may have cartoon fish and the metadata may include the keyword "fish" to allow for the identification of the category of related content involving "fish." Continuing with the example, the cartoon movie may be found in a hierarchy such as "Video"→"Cartoon"→"Children"→Cartoon Movie Title and the categories chosen for pivots may be unrelated to the hierarchy used by the partner. The pivots may have content from one or more partners and allow the user to navigate between content from a plurality of partners.

A partner and/or content provider may designate one or more Display Template(s) 1 . . . N 112 to choose how their content and/or navigation experience for their content should be displayed on the User Interface 114. The Display Template 112 provides the partner with the flexibility to choose a navigation experience for users when navigating their content within the infrastructure provided by the Content Integration Development Framework 102. The Display Template(s) 1 . . . N 112 may allow the partner to display related content including, but not limited to the following: lists of content represented with text and/or images, lists of text and/or tiles of images that represent metadata of related content, a matrix of tiles with content images, tag clouds, and/or "pivots" that group related content in accordance with metadata. Although implementations are shown with a matrix with a plurality of tiles, those with skill in the art will recognize that the visual treatment may be applied to a single tile on a display or any number of tiles on a user interface.

The User Interface 114 may use the Display Template 112 to display the related content on a Display 118 of a Client Device 116. The Client Device 116 may be any computer system and the software application developed with the Content Integration Development Framework 102 may be installed on the Client Device 116. Alternatively, a software application developed with the Content Integration Development Framework 102 may be installed on a computer system accessible by the Client Device 116. The User Interface 114 may be implemented including, but not limited to, the following implementations: a software interface rendered by a video game console, as a set of WebPages, a software user interface, or any other type of user interface supported by the Client Device 116. In one or more embodiments, the user interface may be implemented in C++ and/or JavaScript.

The User Interface 114 may use a Tile Display Component 120 to display a tile display and/or matrix of tiles with content images. The Tile Display Component 120 may be used to display one or more content images within a matrix of tiles on the User Interface 114. The Tile Display Component 120 may use an Image Optimization Component 122 to optimize the image for display. The Image Optimization Component 122 may allow for resizing and/or altering the aspect ratio of content images.

The size of an image may be adjusted by the Image Optimization Component 122 automatically by defining a pixel size and/or a percentage. For example, if desired, an image with a size of 100×100 pixels may be reduced to 50×50 pixels by the Image Optimization Component 122 with a definition for a different pixel size 50×50 pixels and/or the percentage 50%.

The Image Optimization Component 122 may change the aspect ratio. For example, the pixel aspect ratio may be changed from 16×8 to 16×9, and/or from 8×5 to 4×3 with the Image Optimization Component 122. Images that are provided by one or more partners may have different sizes and aspect ratios. In an embodiment, the Image Optimization Component 122 may alter the size and aspect ratio in order to create a more uniform user interface display when there is limited distortion to the content image. The Image Optimization Component 122 may make a decision as to whether the resizing is possible without distorting the image and compromising the quality of the image. In an embodiment, the image optimization may be done manually with image editor. In another embodiment, the optimization may be done programmatically and/or a combination of programmatically and manually.

The Image Optimization Component 122 may be used to change the format of the file including, but not limited to, .jpeg, .gif, and/or any other compression or format for images. The Image Optimization Component 122 may also be used to create images from video files. For example, the Image Optimization Component 122 may select a still image from a video content file to represent the video file in the display.

The Tile Display Component 120 may render the optimized images within the tiles of matrix, such as in a tile display of the user interface. The Tile Display Component 120 may use a visual treatment to fill excess space within a tile, such as a reflection visual treatment. The Reflection Visual Treatment Component 124 may be used by the Tile Display Component 120 to create a reflection to fill excess space within a tile that is not used or filled by an image.

Figure 1B:
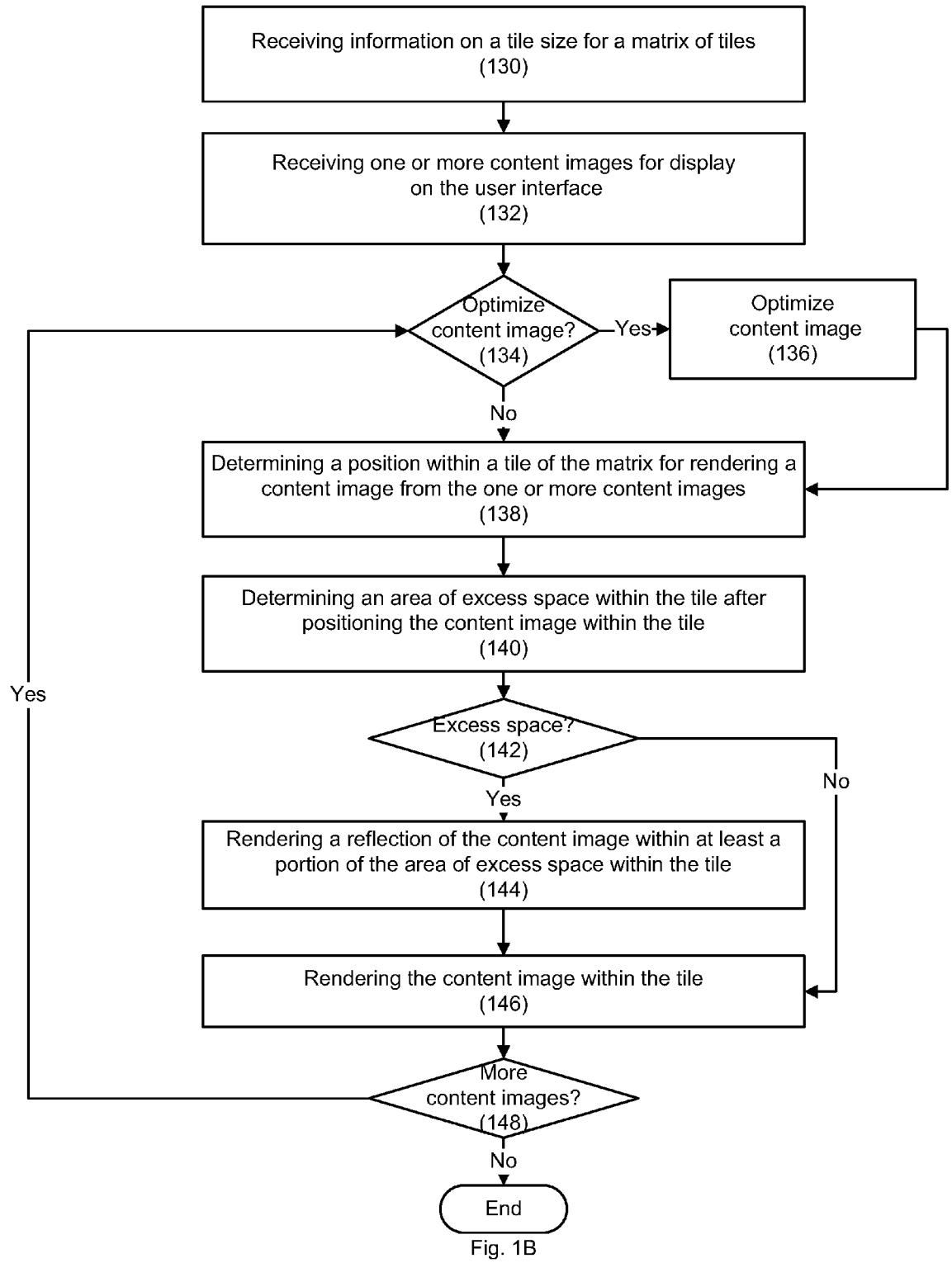
FIG. 1B illustrates a flow chart of an example of an implementation of a user interface for a software application utilizing a content integration development framework.

FIG. 1B illustrates a flow chart of an example of an implementation of a user interface for a software application utilizing a content integration development framework. Information may be received on a tile size for a matrix of tiles (130). The matrix of tiles on a user interface is a display of rows and columns of tiles (e.g. content images) on the user interface. For example, a 4×3 matrix would have four rows and three columns of tiles. The tiles may be evenly spaced on the user interface in rows and columns such that the matrix of tiles may give the appearance of a grid on the user interface.

The tile size may be determined based upon information such as the available space to display evenly spaced tiles in rows and columns on the user interface. There are many factors that may determine the tile size for the matrix displayed on the user interface, including, but not limited to, information on the following: an available space for display of the matrix, a user defined sizing for the tiles, a fixed size for tiles in a uniform interface for content integration, a size that does not compromise the quality of the content images for display, a number of rows and columns in the matrix, and/or any other factors that may affect the display of the tiles in a matrix on the user interface. For example, the user interface may have a fixed size for content images displayed in a tile display on a user interface, and a content image selected by a user may be a larger size than the other content images displayed on the user interface. In another example, the tile size may be determined based on information that the matrix of tiles will be displayed as thumbnails in the background and an embedded player may be in the foreground. In a preferred embodiment, the tile size may be a square shape with an aspect ratio of 1×1.

One or more content images for display on the user interface are received (132). The one or more content images for display on the user interface may be from one or more partners contributing content, and as such, the received content images may be of varying sizes and aspect ratios. The content images chosen for display in a matrix on the user interface will be described in more detail below with FIGS. 2-4. For example, the content images to be displayed in the matrix may be chosen based upon user inputted search terms and other personalization factors, such as location of the user, history of discovery of content of one or more users, and/or any other factors that may aid the choosing of content images for display on the user interface.

Next, a determination is made as to whether to optimize the content image (134). The content image may be optimized before it is rendered on the user interface. In an embodiment, the content image may be optimized and stored in multiple formats for later retrieval and display on a user interface. For example, multiple sizes of a content image may be stored (e.g. a small image and a large image) for fast retrieval and display.

If optimization of the image is desired, then the content image is optimized (136). There are various optimizations that can be performed on the content image, including but not limited to, the following: altering the aspect ratio, resizing the image, resizing the image to accommodate the tile size for the matrix, sharpening or blurring the image, changing the compression format, and/or any other optimizations for content images. It may be desirable to limit distortion, cropping, or compromises in quality of the images with the optimizations. For example, the aspect ratio and/or size may not be optimized in order to keep the quality of the original image provided by the partner. Continuing with the example, if a content image is received that has a size of 100×100 pixels, then a reduction in size to 50×50 pixels may not compromise the quality of the content image and the optimization may be performed. Alternatively, if a 50×50 pixel content image is received, then an increase in size to 100×100 pixels may compromise the quality of the image and the optimization may not be performed.

In another example, a content image may be received with an aspect ratio of 16×8 and an optimization may be performed to provide the content image with an aspect ratio of 16×9. The decision to make optimizations may depend on the other images received for display and optimization decisions may be adjusted accordingly. For example, if there are a larger number of images with a similar aspect ratio, then the other images may be optimized to an aspect ratio for the majority of the one or more content images received for display. In an embodiment, the decision to optimize an image may be made on an image by image basis to ensure that quality is not compromised with the optimizations. Next, a position within a tile of the matrix for rendering a content image from the one or more content images may be determined (138).

Continuing with FIG. 1B, if optimization of the image is not desired, then a position within a tile of the matrix for rendering a content image from the one or more content images may be determined (138). In a preferred embodiment, the top of the content image is aligned with the top of the tile. The position for placement of content image within a tile may vary based upon the content images and adjustments may be made accordingly. The position may be altered based upon each individual content image. For example, the position may be fixed to present a consistent user interface and/or the position may be adjusted to reduce the amount of excess space that would be noticed on the user interface with the particular content image.

In an embodiment, a selected content image or a content image that is highlighted for the user may be positioned differently in a tile from the other images displayed in the matrix. For example, a selected content image may have an additional border placed around the image and the image may have a different position within the tile from the other content images in the matrix. In another example, a content image may be displayed within an embedded player and have a different position within the tile from the other content images.

An area of excess space within the tile after positioning the content image within the tile may be determined (140). The area of excess space may be dependent on an aspect ratio of the first content image or a size of the first content image. For example, the size of the content image after optimization may fill ⅔ of a square tile and the area of excess space may be ⅓ of the square tile. In another example, the aspect ratio of original content image may allow for resizing of the image but the content image after optimization may remain as a rectangle (e.g. 16×9 aspect ratio) and an area of excess space may remain when the rectangle shaped content image is placed in a square tile.

Next, a determination is made as to whether there is excess space (142). If there is no excess space within the tile with the content image, then the content image is rendered within the tile on the user interface (146).

Alternatively, if there is excess space (142), then a reflection of the content image is rendered within at least a portion of the area of excess space within the tile (144). A reflection visual treatment may be applied to the tile to provide the appearance of a mirrored image of the content image within the tile. The content image may be flipped or rotated vertically so that a mirrored image may appear at the bottom of the tile. The reflection visual treatment may cause the mirrored image to be dimmed in comparison to the content image and/or made translucent to suppress the intensity of the content image. The mirrored image may be blurred or sharpened with the reflection visual treatment. In a preferred embodiment, the mirrored image may have 30% opacity. Although a preferred approach to applying a reflection visual treatment is described, those with skill in the art will recognize that there are a variety of ways to apply a reflection visual treatment with a content image.

Next, the content image is rendered within the tile of the matrix (146). The content image is rendered within the tile at the position determined in the matrix. If there are no more content images for display on the user interface (148), then the process may end. Alternatively, if there are more content images for display on the user interface (148), then the process may repeat (134).

Figure 1C:
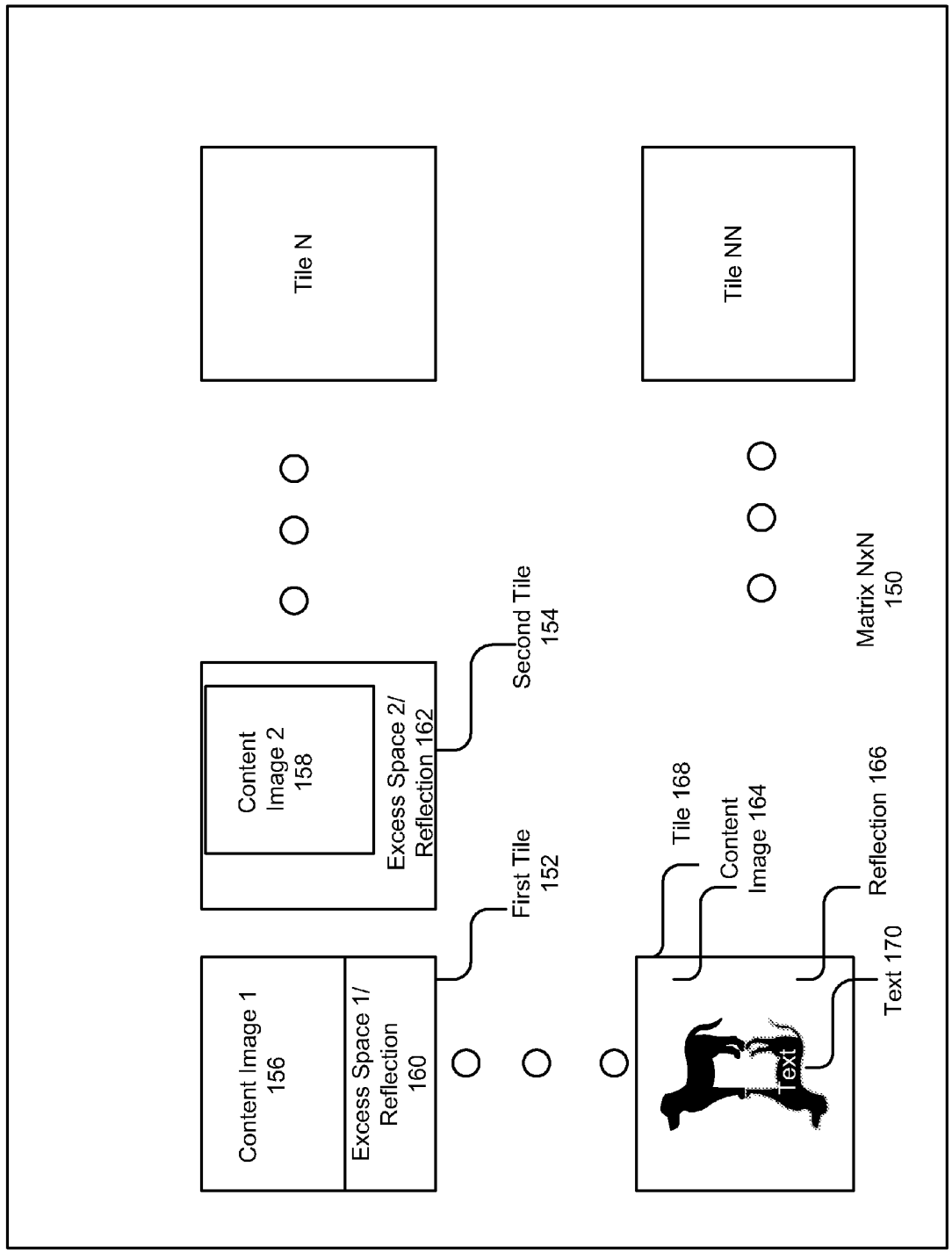
FIG. 1C illustrates an example of a user interface of an implementation of a software application utilizing a content integration development framework

FIG. 1C illustrates an example of a user interface of an implementation of a software application utilizing a content integration development framework. FIG. 1C illustrates a Matrix 150 of tiles with N rows and N columns on a user interface. The Matrix 150 has tiles that are the same size and are evenly spaced on the user interface. A First Tile 152 and a Second Tile 154 have content images and visual treatments applied within the excess space not consumed by their respective content images.

The First Tile 152 has a first content image (i.e. Content Image 1 156) that differs in size and/or aspect ratio from the second content image (i.e. Content Image 2 158) of the Second Tile 154. As indicated throughout, the content images may have different sizes and aspect ratios even after an optimization is optionally performed on the images. The area of excess space within the tile or the portion of the tile that is not consumed by the content image may differ between the First Tile 152 and Second Tile 154 (e.g. as illustrated in FIG. 1C with Excess Space 1 160 and Excess Space 2 162) after the positioning of the images within their respective tiles. The differing areas of excess space between the tiles may be attributed to the image sizes and/or aspect ratios of the content images in the matrix. A reflection of the respective first image and second image may be rendered within at least a portion of the respective areas of excess space within the tiles, as illustrated. A Content Image 164 with a dog is reflected within the area of excess space with the Reflection 166. In the tile, the Reflection 166 is inverted.

Tile 168 shows an example of an image and its reflection within a tile. In tile 168, Content Image 164 includes an image of a dog that is reflected within the area of excess space toward the bottom of the tile and below Content Image 164. Reflection 166 is created to be adjacent to, or abut, Content Image 164 and to be a vertically inverted reflection of the image. Text 170 is shown overlaying Reflection 166. In a preferred embodiment, text is overlayed onto the reflection and not on the image itself. This allows text to be associated with the image in a visually connected and appealing way without obscuring the image. Note that other embodiments may use different reflection and text positioning.

In one or more embodiments, the content images size and the area of excess space may be the same between a first tile and a second tile. The area of excess space within the tile that is used for the reflection is dependent on the size (e.g. 50×50 pixels) and/or aspect ratio (e.g. 16×9), and the optimization (e.g. resizing) available with the content image without distorting the image or compromising the quality of the content image. For example, the area of excess space may differ when a first content image and a second content image differ in size and aspect ratio, optimization may not allow for resizing to the same size, and each image is to be rendered within tiles of the same size. Continuing with the example, the content images with different sizes may have different areas of excess space when rendered within tiles of the same size.

In a preferred embodiment, text may be written across the reflection of the image and the reflection visual treatment may be applied to have enough contrast so that the text may be easily viewed on the user interface. The contrast may be adjusted in accordance with the content images being rendered and reflected within the tiles of the matrix.

Figure 2A:
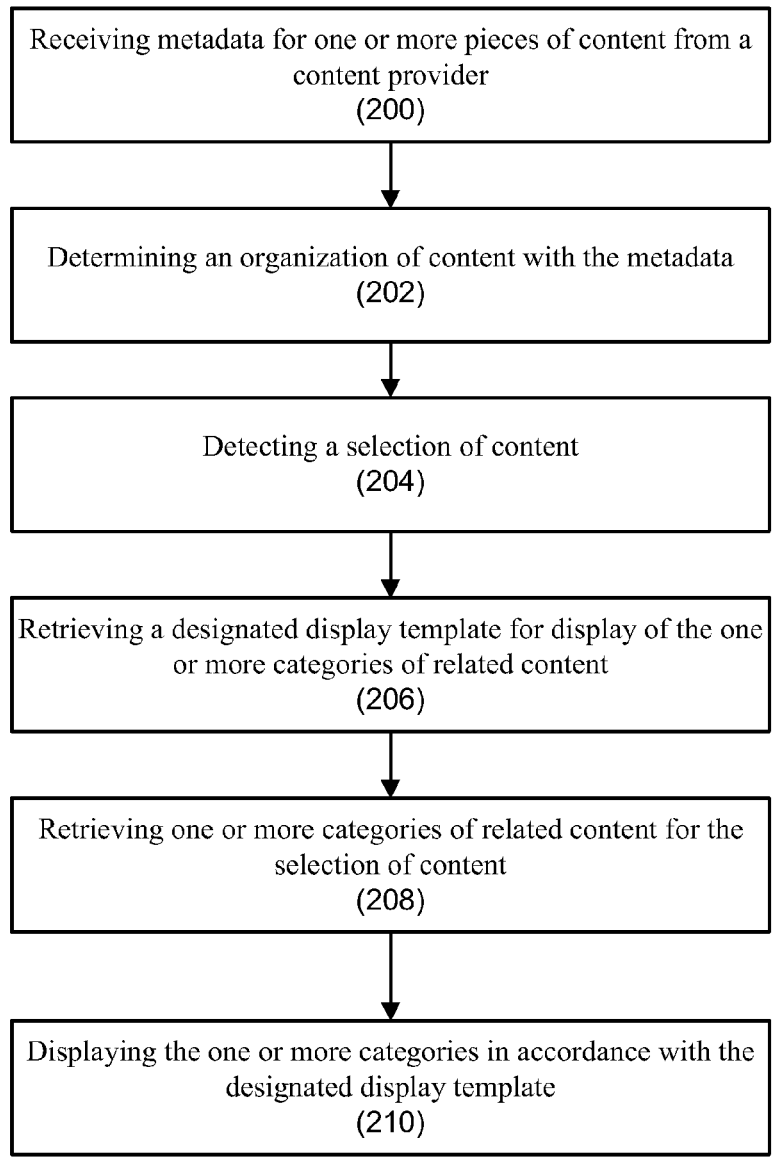
FIG. 2A illustrates a flow chart of an example of an implementation of a software application utilizing a content integration development framework.

FIG. 2A illustrates a flow chart of an example of an implementation of a software application utilizing a content integration development framework. Initially, metadata may be received for one or more pieces of content from a content provider (200). The metadata may provide a description of content, information on the hierarchy for a content provider, relationships between the content and other content within the content provider's hierarchy, images, image titles, a content address, title, date, tags for the content, and/or any other text related to the content. Keywords may be determined from the metadata for each piece of content. The keywords may be used to categorize the content and/or place the content into a hierarchy/organization for content integration. Multiple sources for content metadata may be used as a reference for keywords to categorize or organize the content. In one or more embodiments, metadata for a piece of content from a plurality of sources may be used to identify keywords for the piece of content. Metadata for content identified as related to a piece of content may also be used to identify keywords for the piece of content.

Keywords may be identified from a piece of content based upon the frequency that the keyword is found within the metadata and/or the confidence in a particular word being a keyword based upon the type of metadata retrieved from the partner. For example, if a keyword is repeatedly found within the description provided by a partner and a review or synopsis of the content provided by an alternate source, then there may be more confidence in the particular keyword being an appropriate keyword for the content. In other embodiments, if text is found within a tag for the content, then the assignment of the text as a tag for the content may provide sufficient confidence for the word to be used as a keyword.

Content with similar keywords may be grouped or categorized together as being related content. For example, content with the keyword "fish" in the title, image title, description, hierarchy description, and/or any other text for the content may cause a first piece of content and a second piece of content to be categorized under the category "fish" and grouped together as related content. The metadata for content may change over time and each update to the metadata for a piece of content may alter the categorization and/or grouping of related content.

In one or more embodiments, keywords found within the metadata for related content may be used to categorize/group the content. For example, a piece of content may have content that a source has designated as related and the metadata (e.g. the description for the content, etc.) for the content designated as related may also be used as keywords for the piece of content. The text found in the metadata may be normalized to allow for identification of the same keyword in the metadata for content. For example, "fishing" and "fish" may be normalized to the word fish to identify content with similar keywords.

The categories/groups of related content may be weighted to ensure that the most relevant category or grouping of related content is presented to the user. Factors that may cause related content be weighted as more relevant, include, but are not limited to: a partner designates content that is related, multiple sources for content grouped the content together, common images were shared by the content, and/or any other factor that may be used to determine content is related.

The metadata may be used to determine an organization of the content (202). By grouping/categorizing content that is related using keywords found in the metadata, a new organization for the content may be formed. In one or more embodiment, a first piece of content may be related and connected to a second piece of content in a new organization of content, and a list of keywords shared between the first and second pieces of content may indicate the category or categories shared by the content.

A selection of content may be detected (204). The user may select the content after discovering the content with the User Interface 114 of the Content Integration Framework 102. The user may select content using a variety of methods, including but not limited to, the following: navigation to content, inputting text to identify the content, selecting an image representing the content, using radio buttons to select content, touching the screen to select content, highlighting the content for selection, and/or any other way to input or communicate a selection of content to the Content Integration Framework 102. In a an embodiment, the user may enter text, receive a display of a set of tiled images representing content in response to the inputted text, and the user may select content by selecting on one or images on a display of tiled images. In another embodiment, the user may communicate with a computer system running the content integration application developed with the Content Integration Framework 102 using another device (e.g. a remote, a mouse, a smartphone, or any other type of controller for the computer system) to select content.

The user may select one or more pieces of content and the selected content may be displayed in accordance with metadata from one or more partner(s). The metadata that corresponds to the selected content may be retrieved from the databases of Content Metadata 1 ... N 106. The metadata may provide a description of the selected content, a title, and/or any other text that may be displayed with the content. The metadata may indicate that the selected content should be provided with a particular embedded player for the content. Partners may designate what metadata is desired to be displayed with the selected content, such as titles, text, links and/or images.

A designated display template for display of the one or more categories of related content may be retrieved (206). The display template(s) allow the partner to define the navigation experience for the user. A partner may designate a display template from the database of Display Template(s) 1 ... N 112 for content at any level of granularity as desired. The partner may designate a display template for all of their content, for particular types of content, for a specific piece of content, for a genre of content, for a category of content, and/or any other level of granularity for the content. For example, the metadata for the selected content may identify the partner and an identifier for the content and a display template may be retrieved using a combination of an identifier for the partner and an identifier for the content from the database.

The display template may indicate how the one or more categories of related content may be displayed for further navigation of content by the user. The display template provides the partner with a great deal of flexibility in defining the navigation experience for the user with the integrated content.

In one or more embodiments, the display template may have "pivots" for display in the related content area of the display. For example, the display template may indicate that each category have its own "pivot" displayed. A "pivot" is a category available for selection and selection of the pivot may display one or more pieces of related content and/or further categories designated in the category. The pivot may be displayed as an image and/or descriptive text representing the category and may be viewed as having stacks of one or more pieces of related content and/or additional categories for the pivot. For example, for a selected content of a movie with a setting in New York City, a pivot may be displayed with the selected content for the category "New York" and all related content for New York (e.g., lyrics for songs referencing New York, other movies set in New York, etc.) would be available upon selection of the pivot. The pivot may be viewed as a stack or list of related content and/or categories for the selected content.

Embodiments may have display templates that utilize tag clouds or text displayed of varying size and/or font for the categories. The size and font may be larger and/or bold for categories of related content with a probability of being chosen by the user after the selection of the content. Although an example is provided for implementing a tag clouds using probability, those skilled in art will recognize that there are many ways to determine more relevant related content, such as with weighted systems, and/or statistics. In another embodiment, the partner may indicate a preference for categories that should be more prominent in the display for the user. For a tag cloud, the preferred category may be made more prominent with larger text, bolding, a particular font, a larger image representing the category, a particular placement in the user interface, and/or any other method for causing a category to stand out.

In another embodiment, the display template may indicate that content from multiple partners may be displayed together. The partner may specify both how and where the other partner's content may be displayed as well as the amount of content from other partner's is permitted. For example, the partner may limit the content from other partners to a certain type of category of related content, a percentage of categories of related content, and/or any other limitations may be placed on other partner's content that may be included.

In another embodiment, the same piece of content may be available by multiple partners and a decision must be made as to which display template to use and/or a partner may not have designated a display template. The Content Integration Development Framework 102 may have default display templates to handle such cases.

As indicated above the partner may have an organization or infrastructure for their content, the metadata from the partner may indicate the partner's organization/infrastructure as well as categories of related content and/or related content that may be displayed with the selected content. The designated display template may indicate that the related content and/or categories available with the partner's infrastructure/organization be displayed on the template.

Although the implementation of the display templates may be described above as devoting the entire related content section of a user interface to one type of display method, those skilled in the art will recognize that portions of the display template may be displayed using one method and any number of portions of the related content section may be displayed using another method. For example, the display template may indicate that that a portion of the related content section display partner-defined related content categories (e.g., using the partner's metadata) and another portion of the related content section may have categories defined by metadata from another source.

Next, one or more categories of related content of the selection of content are retrieved (208). The metadata retrieved from the Content Metadata 1 . . . N 106 for the content may be used by the Content Categorization Component 110 to determine what content is related to the selected content. As indicated above, metadata from partners as well as third-parties may be utilized to identify categories of related content. For example, a partner may categorize a cartoon for children and indicate related content is in the category of cartoons for children. Continuing with the example, a third-party may have metadata to indicate categorizing the same cartoon as related to content with categories "deep-sea" and/or "fish."

In an embodiment, the partner may indicate particular categories that the partner wants to be related to their content. For example, a partner may want a "cartoon" category displayed with all of their cartoon content when the cartoon content is selected. The partner may indicate a percentage of their content that the partner wants placed in each of the categories of related content. For example, the partner may designate that 75% of the content placed in related categories for display to the user must be their content.

Next, the one or more categories are displayed in accordance with the designated display template (210). The display template may be implemented as a set of rules as selected by the partner for display of related content.

Figure 2B:
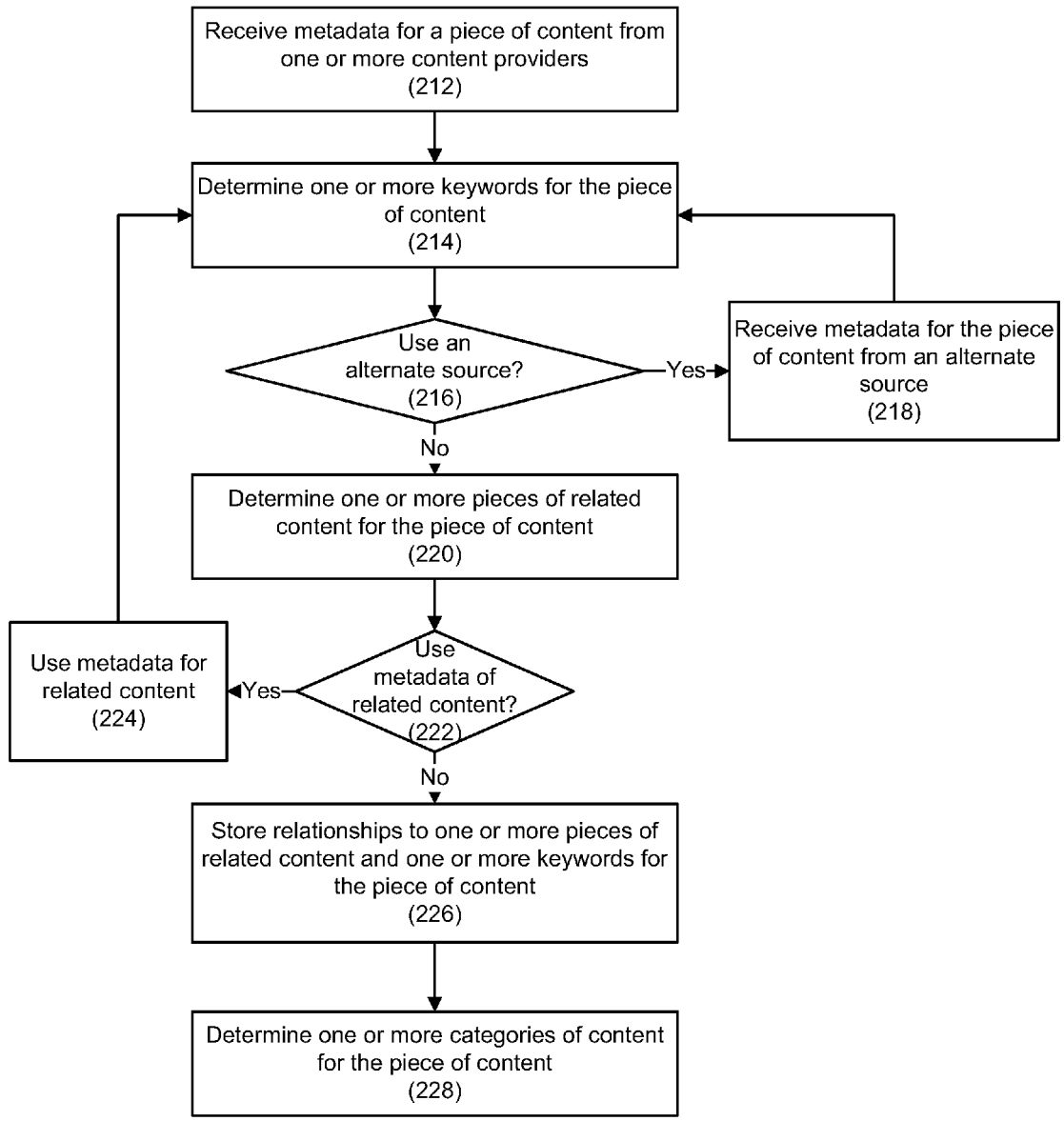
FIG. 2B illustrates a flow chart of an example of an implementation of a software application utilizing a content integration development framework.

FIG. 2B illustrates a flow chart of an example of an implementation of a software application utilizing a content integration development framework. FIG. 2B illustrates a flowchart for determining an organization of content with the implementation of a software application using the Content Integration Development Framework 102. Initially, metadata for a piece of content from one or more content providers is received (212). The Content Integration Component 108 may retrieve metadata from one or more content providers from Partner Content 1 . . . N 104 database(s) for a piece of content and store the metadata in Content Metadata 1 . . . N 106 database(s). Metadata for a piece of content may include, but is not limited to, the following: textual descriptions of the content, titles, dates, images representing content, image titles, or any other data for the piece of content.

Next, one or more keywords are determined for the piece of content (214). Keywords may be determined for the piece of content from the metadata provided by one or more content providers. A keyword may be associated with a piece of content if it is found within the metadata for the piece of content and/or metadata for a related piece of content.

A determination may be made as to whether to use an alternate source for metadata (216). A reference source for descriptions of content may be desired to enhance the metadata for a piece of content in order to accurately organize and categorize the content integrated. If metadata for an alternate source is desired (216), then metadata is received by the Content Integration Component 108 from the alternate source (218). The metadata may be used to determine one or more additional keywords for the piece of content (214). Alternatively, an alternate source may not be desired for additional metadata (216).

Continuing with FIG. 2, one or more pieces of related content for the piece of content may be determined (220). The keywords may be used by the Content Integration Component 108 to determine related content for the piece of content. If one or more keywords for a piece of content are found in metadata for another piece of content, then the content may be deemed related. The keywords found in the metadata for both pieces of content may be a category for both pieces of content and may be identified as a category for both pieces of content by the Content Categorization Component 110.

A determination may be made as to whether to use metadata of related content (222) to identify related content and enhance the organization of content with the Content Integration Development Framework 102. If metadata of related content is desired for organizing content (224), then the Content Integration Component 108 may use metadata for related content to enhance the organization of content (224). Metadata from related content to the piece of content may be used to identify more keywords for the piece of content (214) and the process will repeat determining related content and keywords. Alternatively if metadata from related content is not desired for enhancing the organization of the content (222), then relationships to related content and keywords are stored for the piece of content (226).

The Content Categorization Component 110 may use the related content and keywords to determine categories for the piece of content. The Content Categorization Component 110 may order and/or use a weighting system to identify the more relevant categories for the piece of content.

Figure 3:
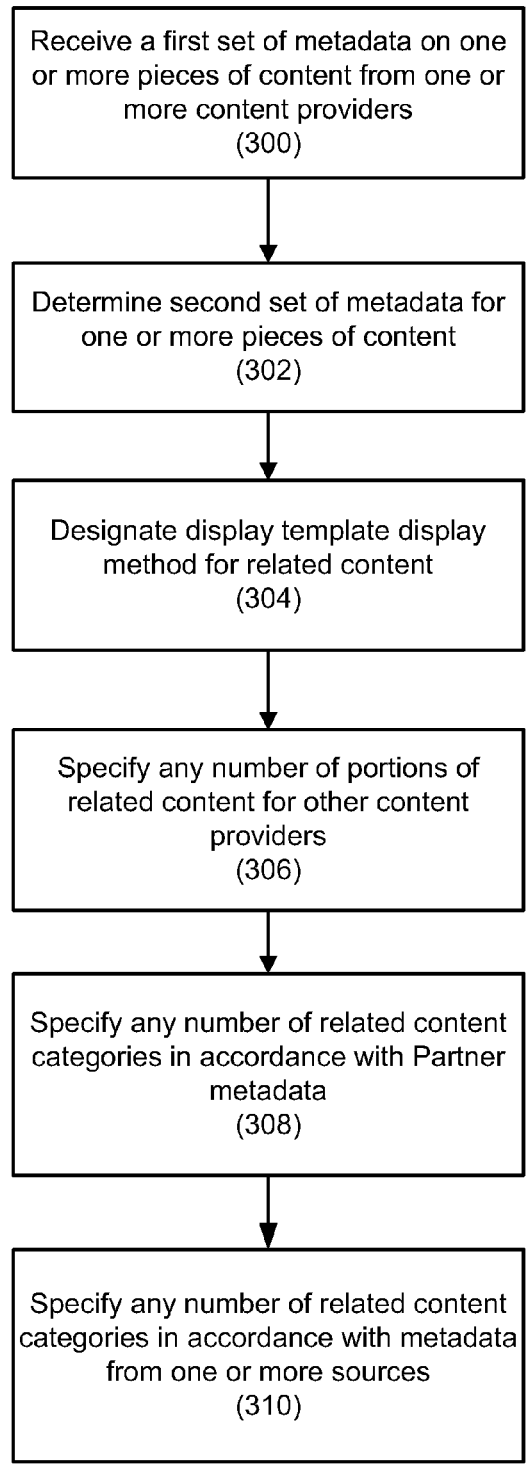
FIG. 3 illustrates a flow chart of an example of an implementation for defining a display template for a content integration development framework.

FIG. 3 illustrates a flow chart of an example of an implementation for defining a display template for a content integration development framework. Initially, a first set of metadata may be received on one or more pieces of content from one or more content providers (300). The first set of metadata received on the content to integrate may be from the content provider or partner. The first set of metadata on the one or more pieces of content to integrate may describe the content as well as indicate where the content fits in the hierarchy in the partner's infrastructure. Categories for the content may be identified for each piece of the content to integrate from the content provider.

Next, a second set of metadata for the one or more pieces of content may be determined (302). A second set of metadata may be determined from an alternate source for the one or more pieces of content. In a preferred embodiment, Gracenote® may be used as a reference or alternate source for metadata for the content. The sets of metadata may be used to categorize the content for the organization of content and for the related content section of the display templates. The use of metadata from an alternate source for categorizing content may provide additional metadata to ensure that the user can flow through the content and/or discover content without being restricted to the hierarchy or infrastructure of a content provider or partner because multiple sets of metadata from multiple sources may be used to reorganize, group, and categorize content. The metadata from the partner may indicate other sources for related content. For example, if the metadata from the partner indicates that the content is within a genre of alternative rock and a year is given for the content, then alternate sources and/or references may be searched or accessed for metadata on content within the same genre and a date range in order to identify related content.

The partner or content provider may designate the Display Template(s) 1 . . . N 112 display method for related content (304). The display method of related content defines the method for which related content to a selected piece of content may be displayed. For example, the partner may designate that the display method for the related content section of the Display Template 112 should use pivots, a tag cloud, a list and/or related content. Any number of Display Template(s) 112 may be designated by the partner. For example, the partner may designate a default template, a template for a particular category, a template for a genre and/or a template for one or more pieces of content. A Display Template 1 may be defined for any audio-video content and the "Display Template 1" may designate that the pivot display method be used for related content in the related content section of the user interface.

Next, the partner may optionally specify any number portions of related content for other content providers (306). A partner may specify a proportion and/or a percentage of content that the partner will allow from another content provider to display with their content in the related content section. For example, the partner may specify that ¼ of the related content for "Display Template 1" may be from another content provider. Alternatively, the partner may specify in the display template that no other content provider may display related content in the related content section with their selected content. Optionally, the partner may designate particular partners that can display content in the related content section of the display.

Any number of related content categories may be specified in accordance with partner metadata (308). The partner may specify portions of the related content have categories that are in accordance with the partner metadata for the content. For example, the partner may specify that one or more pivots have categories that are found within their hierarchy or infrastructure. Continuing with the example, the partner may specify that a pivot in "Display Template 1" have related content that is discovered by the partner with a collaborative filter. In another example, the partner may specify that one or more pivots have categories that are nodes (e.g., genres) within their tree hierarchical structure for the content. Alternatively, the partner may choose to rely entirely on the metadata from an alternate source for categories within the related content section for display.

Any number of related content categories may be specified in accordance with metadata from one or more sources (310). The partner may specify portions of the categories of related content be in accordance with multiple sources of metadata. In a preferred embodiment, Gracenote® may be used as a reference or alternate source for metadata for the content. Continuing with the example, the partner may specify that the remaining pivots of "Display Template 1" use categories that rely on Gracenote® metadata.

The Display Template 112 may then be used for display of related content in the related content section for the User Interface 114 of the Content Integration Development Framework 102. Although the examples for FIG. 3 may refer to specific implementations (e.g., the use of categories and pivots) and steps, those skilled in the art will recognize that other implementations may be used and any number of the steps above may be used to define a display template.

Figure 4:
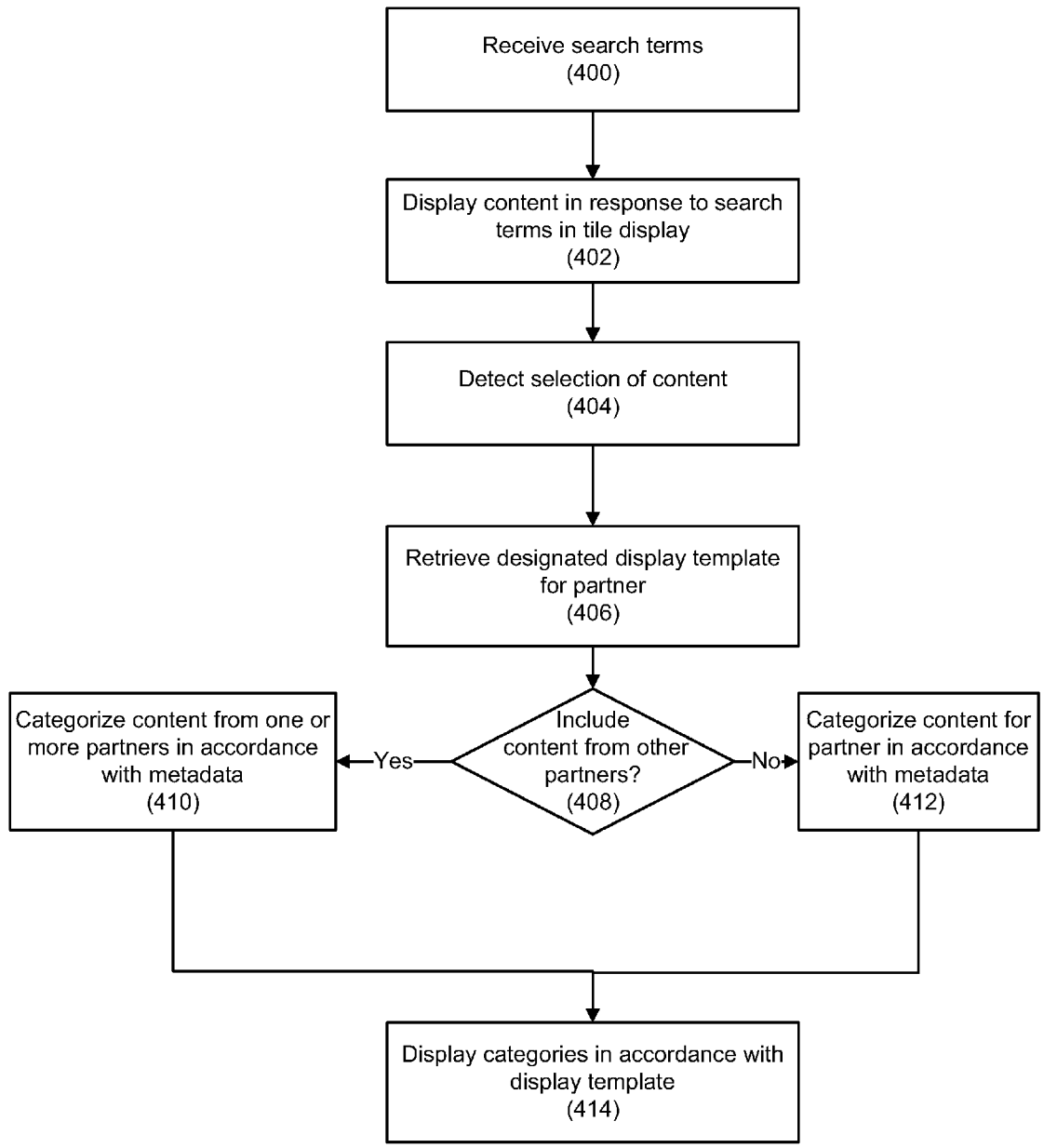
FIG. 4 illustrates a flow chart of an example of an implementation of a software application utilizing a content integration development framework.

FIG. 4 illustrates a flow chart of an example of an implementation of a software application utilizing a content integration development framework. Specifically, FIG. 4 provides an example of content discovery and navigation with a software application developed using a Content Integration Development Framework 102. Initially, inputted terms are received (400). The user may input text terms for content that the user desires to discover in order to begin a search. In another embodiment, the user may select an image that represents content that the user is interested and inputted terms may be identified based upon the selection of the image. Those skilled in the art will recognize that there are a variety of implementations for inputting and sending terms to a component of a software application.

The inputted terms may then be used by the Content Integration Component 108 to discover content relevant to the terms. Content may be displayed in response to the inputted terms in a tile display (402). A tile display of content may display a set of images representing content identified as relevant to the inputted terms by the Content Integration Component 108. A tile display will be described in more detail with FIG. 5. A variety of search methods may be used to identify relevant content for the inputted terms. For example, the inputted terms may be keywords that may be found in the metadata for each piece of content that is identified as relevant by the Content Integration Component 108.

Next, a selection of content is detected (404). A user may indicate a selection of content with the user interface. For example, a user may select content by double clicking an image representing content on the tile display of content.

A designated display template for a partner may be retrieved (406). The display template may be retrieved that is designated for the partner. In an embodiment, the designated display template may be identified with both the partner and the selected content. For example, the partner may have a particular display template for a type of content or a particular piece of content.

A determination may be made as to whether to include content from another partner (408). If content from another partner is to be included (408), then content from one or more partners is categorized in accordance with the metadata (410). The categories may then be displayed in accordance with the display template (414).

Continuing with FIG. 4, if the content from another partner is not to be included (408), then content is categorized for the partner in accordance with metadata (412). The categories may then be displayed in accordance with the display template (414).

Figure 5:
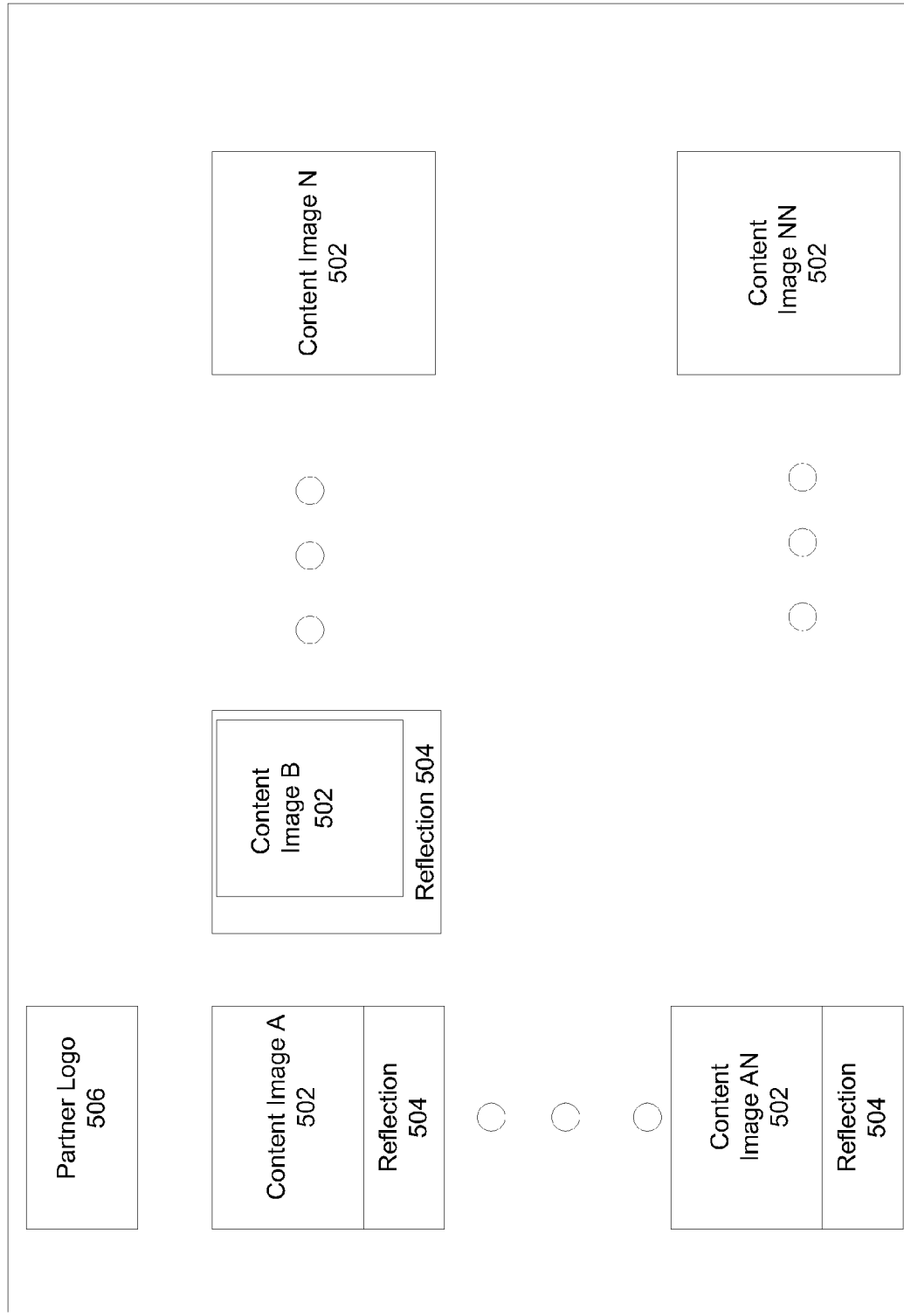
FIG. 5 illustrates an example of a user interface of an implementation of a software application utilizing a content integration development framework.

FIG. 5 illustrates an example of a user interface of an implementation of a software application utilizing a content integration development framework. Specifically, FIG. 5 illustrates a tile display of content on a user interface for the Content Integration Development Framework 102. In a preferred embodiment, a tile display is used when initially displaying content options in response to an input of terms and/or when a category or pivot of content has been selected by the user. The content images of the tile display are arranged in horizontal rows and vertical columns, and each image has a uniform square shape.

In the Tile Display 500 of FIG. 5, Content Image(s) 502 may utilize a visual treatment to ensure that a uniform display of images is provided. In an embodiment, a uniform 1×1 aspect ratio may be used to ensure the size of each image on the tile display is a uniform square. The aspect ratio of the original content image, such as 16×9, may be preserved and a Reflection 504 visual treatment may be applied to fill the excess space to ensure that the image is a square shape. For example, the original content image may have an aspect ratio of 16×9 that may produce an image with a rectangle shape and be placed at the top of the 1×1 aspect ratio square in the tile display, and the ratio of the original content image may be preserved because the excess space may be filled with the reflection of the image to create the square shape for all content images. It may be desirable to fit the 16×9 original content image in the 1×1 aspect ratio square and apply a visual treatment such as reflection because the original content may then be placed in the 1×1 square without cropping and distortion of the original image.

In an embodiment, space may be allocated in the 1×1 square for text to be displayed within the tile. Although an example is provided with a 16×9 aspect ratio, those with skill in the art will recognize that 16×9 and 1×1 aspect ratio are only provided as an example, and the visual treatment can be applied to provide a uniform display with other aspect ratios. The Partner Logo 506 may optionally be displayed with the tile display option.

Figure 6:
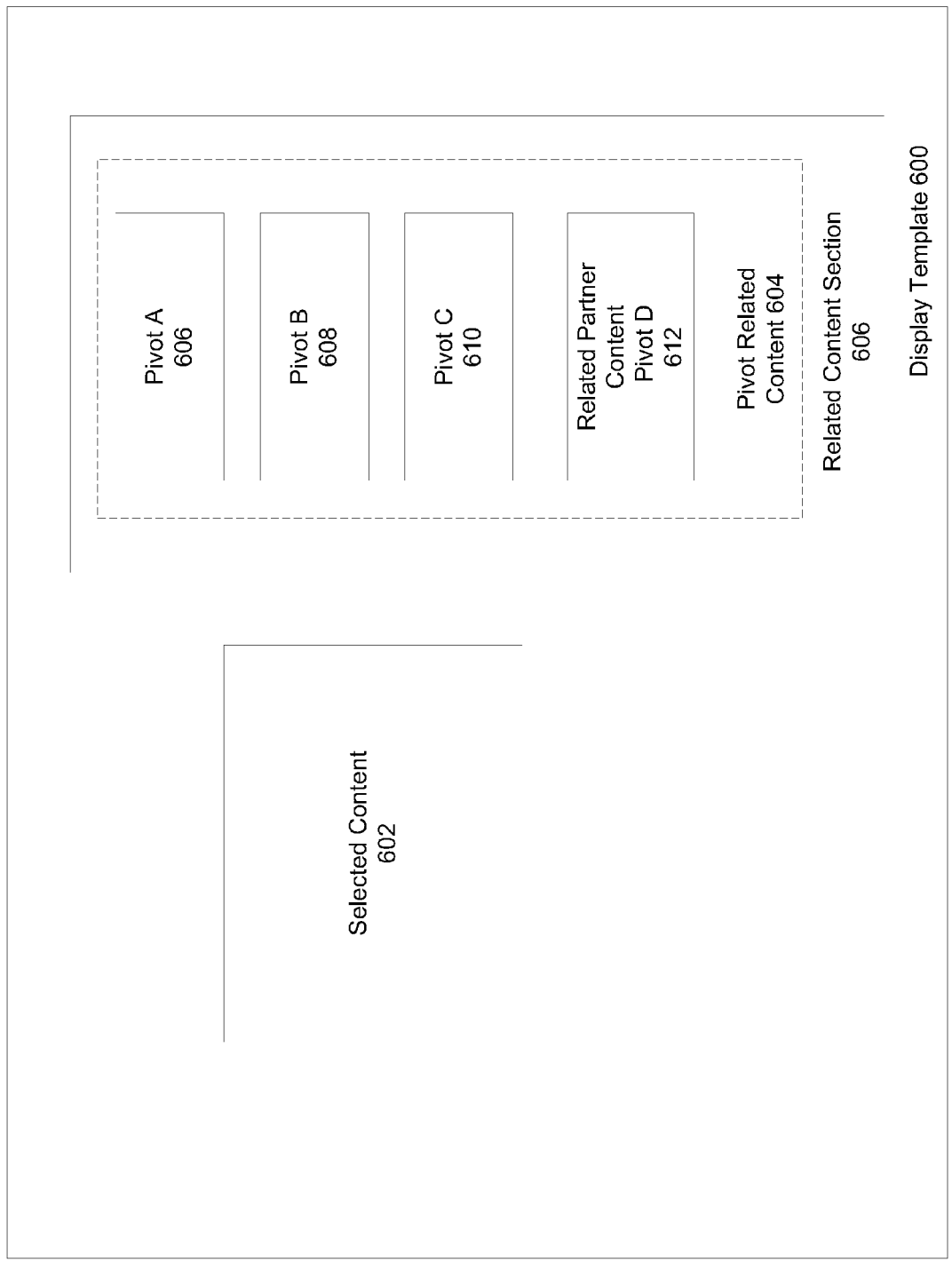
FIG. 6 illustrates an example of a display template for a user interface of an implementation of a software application utilizing a content integration development framework.

FIG. 6 illustrates an example of a display template for a user interface of an implementation of a software application utilizing a content integration development framework. The Display Template 600 in FIG. 6 will display Selected Content 602 with a Pivot Related Content 604 in a Related Content Section 606 on the user interface. Pivots A 606, Pivot B 608, and Pivot C 610 will display a category of content when selected and the category may contain content for one or more partners. When a pivot is selected, the content within the category represented by the pivot may be displayed on the user interface. In one or more embodiments, the content for the pivot is displayed in a tile display format. Related Partner Content Pivot D 612 will display content from the partner that provided Selected Content 602 on the user interface when Pivot D 612 is selected by the user.

Figure 7:
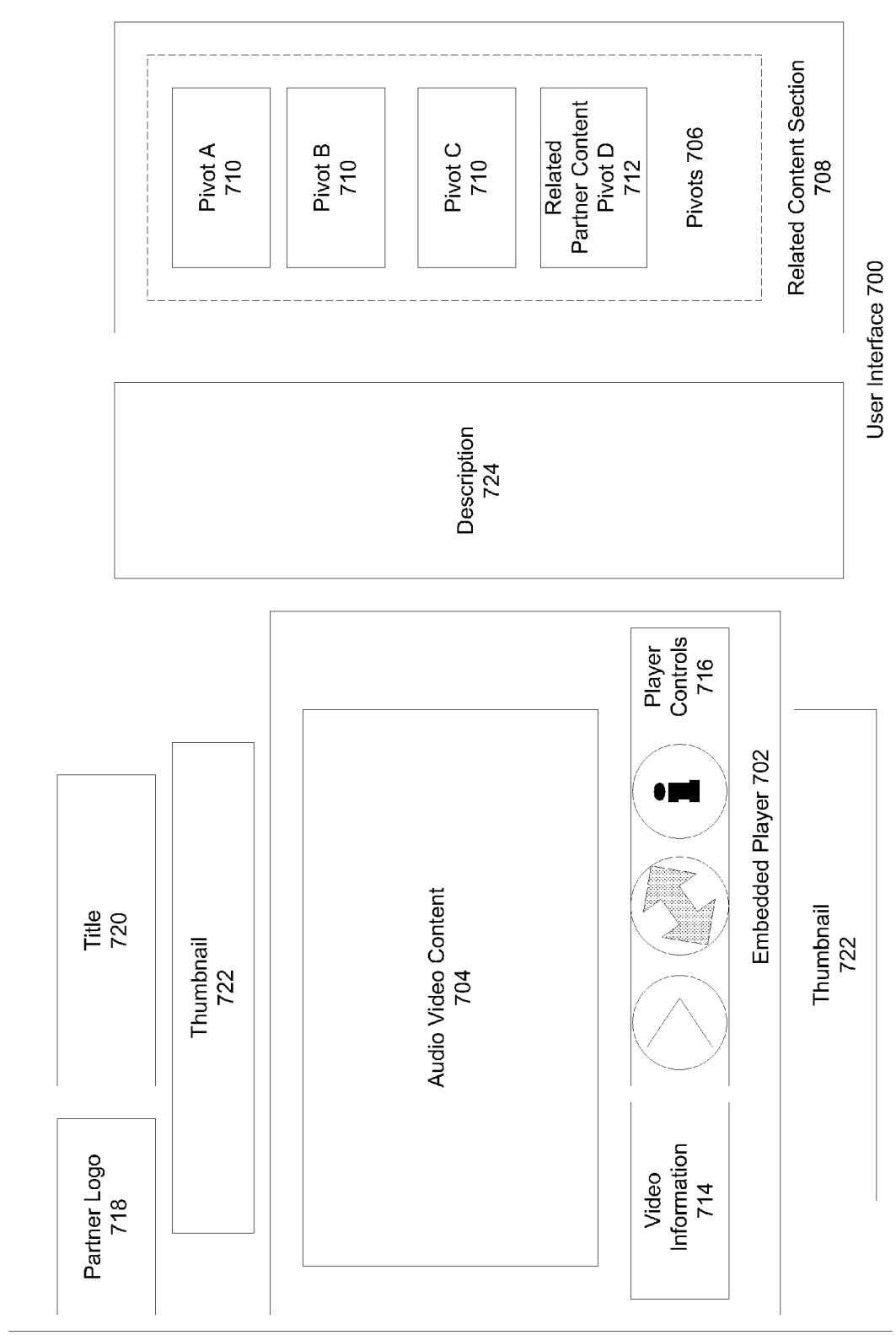
FIG. 7 illustrates an example of a user interface for an implementation of a software application utilizing a content integration development framework.

FIG. 7 illustrates an example of a user interface for an implementation of a software application utilizing a content integration development framework. The User Interface 700 has an Embedded Player 702 for the selected Audio-Video Content 704 and the selected Audio-Video Content 704 is displayed with a Pivot 706 display type in the Related Content Section 708. The Pivot 706 display type is chosen by a partner with a display template, and Pivots A-C 710 and Related Partner Content Pivot D 712 are displayed on the user interface in accordance with the display template. Pivots A-C 710 will display content in the category represented by the pivot when the pivot is selected by a user. The Embedded Player 702 may display Video Information 714 such as the content title, date, partner name, and/or any other information about the selected Audio-Video Content 704. The Embedded Player 702 may have Player Controls 716 for the user to control display of the Audio-Video Content 704. The User Interface 700 may display a Partner Logo 718, a Title 720, and Thumbnails 722 for other content. The Thumbnails 722 may be an image that allows for the display of content represented by the image on the User Interface 700. The User Interface 700 may have a Description 724 of the selected Audio-Video Content 704. The Description 724 may be provided in the metadata supplied by the partner.

Figure 8:
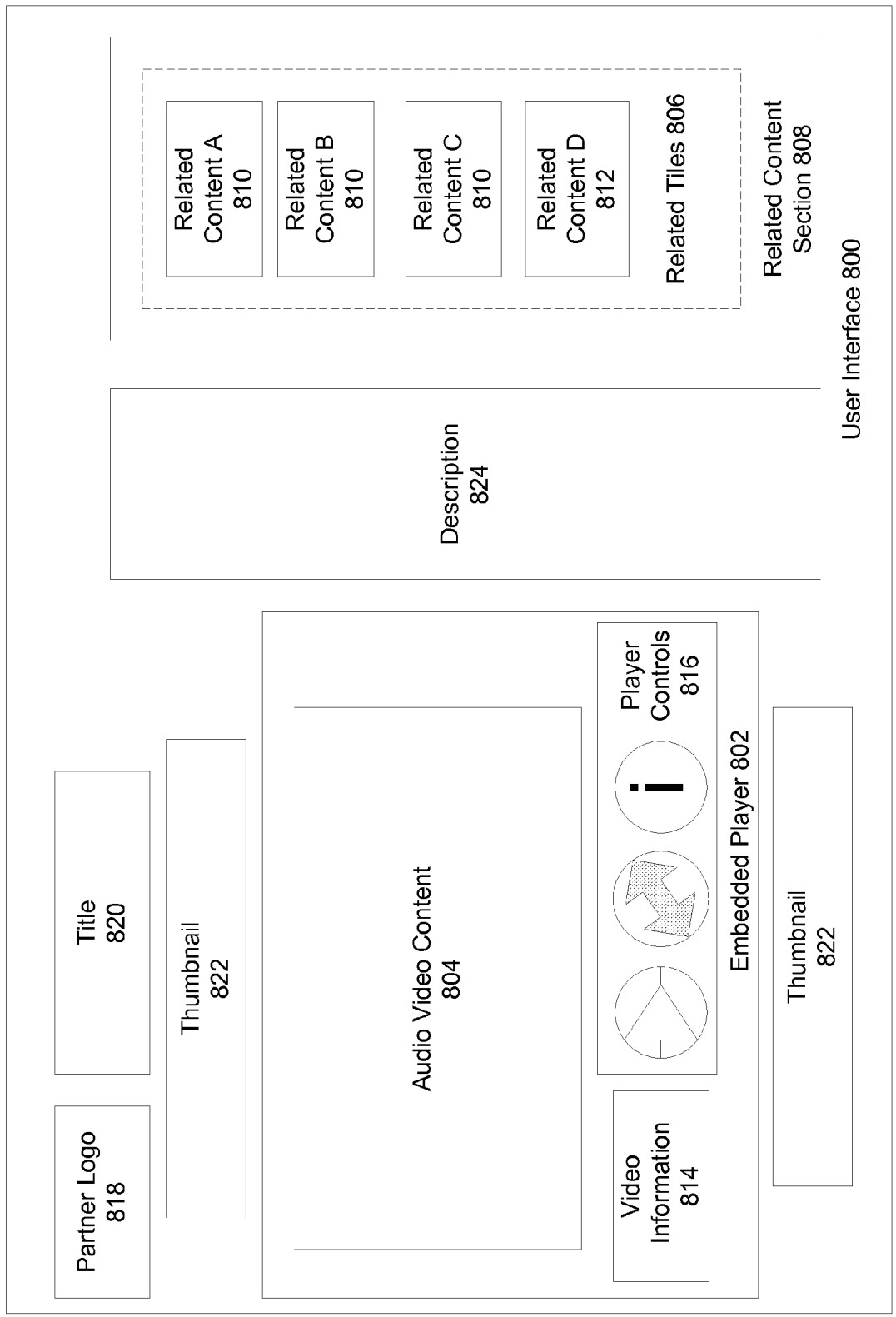
FIG. 8 illustrates an example of a user interface for an implementation of a software application utilizing a content integration development framework.

FIG. 8 illustrates an example of a user interface for an implementation of a software application utilizing a content integration development framework. The User Interface 800 has an Embedded Player 802 for the selected Audio-Video Content 804 and the selected Audio-Video Content 804 is displayed with a Related Tiles 806 display type in the Related Content Section 808. The Related Tiles 806 display type is chosen by a partner with a display template, and Related Content A-C 810 are displayed on the user interface in accordance with the display template. Related Content A-C 810 will display content represented by the Related Content 810 image displayed on the user interface when the Related Content 810 is selected by a user. Related Content D 812 may be reserved by the partner for content provided by the partner that supplied the selected Audio-Video Content 804. The Embedded Player 802 may display Video Information 814 such as the content title, date, partner name, and/or any other information about the selected Audio-Video Content 804. The Embedded Player 802 may have Player Controls 816 for the user to control display of the Audio-Video Content 804. The User Interface 800 may display a Partner Logo 818, a Title 820, and Thumbnails 822 for other content. The Thumbnails 822 may be an image that allows for the display of content represented by the image on the User Interface 800. The User Interface 800 may have a Description 824 of the selected Audio-Video Content 804. The Description 824 may be provided in the metadata supplied by the partner.

Figure 9:
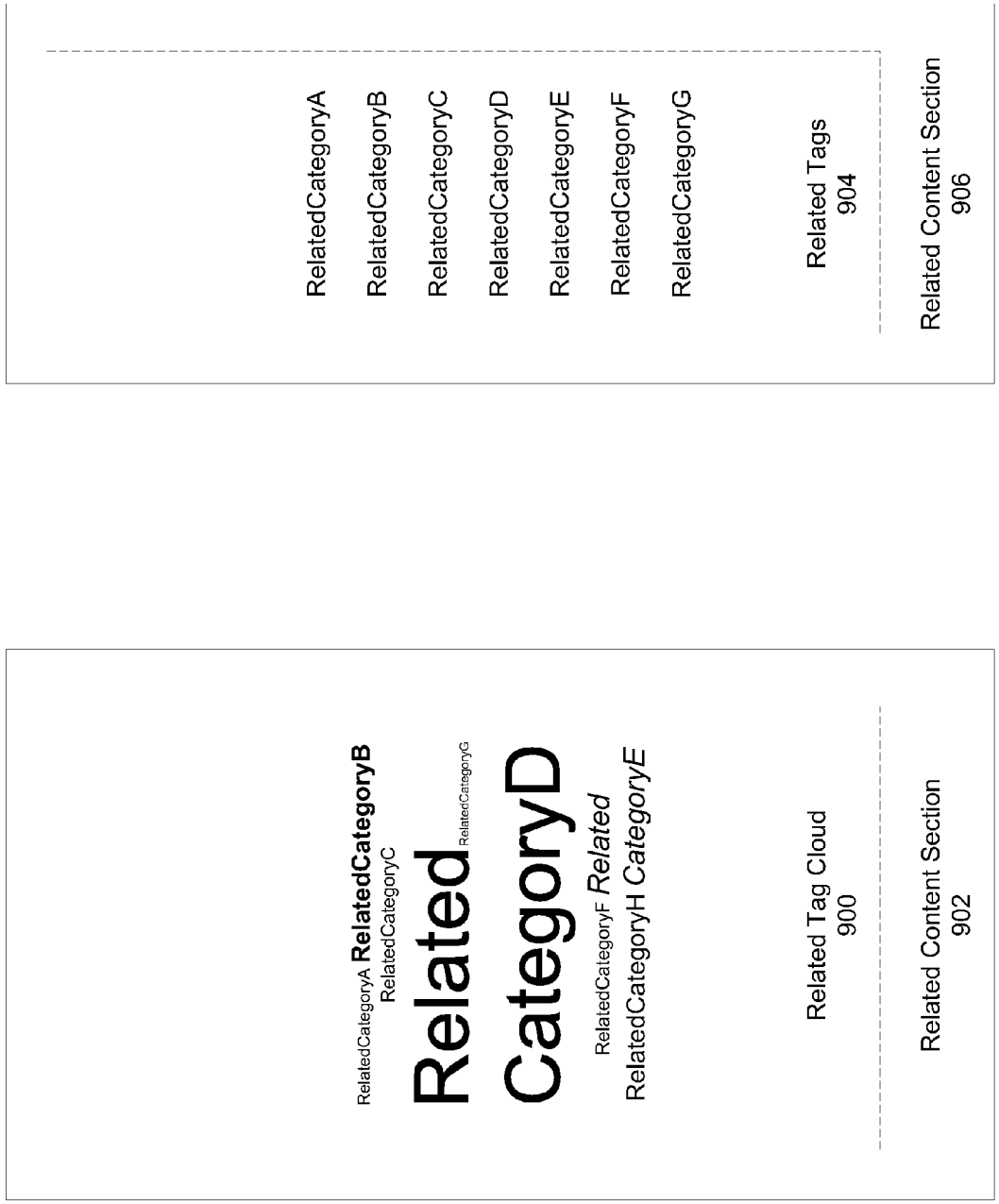
FIG. 9A illustrates an example of a related content section of a user interface for an implementation of a software application utilizing a content integration development framework.
FIG. 9B illustrates an example of a related content section of a user interface for an implementation of a software application utilizing a content integration development framework.

FIG. 9A illustrates an example of a related content section of a user interface for an implementation of a software application utilizing a content integration development framework. FIG. 9A illustrates a Related Tag Cloud 900 display type in the Related Content Section 902 of a user interface. The Related Tag Cloud 900 displays categories options with text of varying fonts, sizes, emphasis with italics, emphasis with bold fonts, and any other text formatting option. Categories presumed to be more relevant to the user may be emphasized with the variance in the font formatting for the categories in the Related Tag Cloud 900.

FIG. 9B illustrates an example of a related content section of a user interface for an implementation of a software application utilizing a content integration development framework. FIG. 9B illustrates a Related Tag 904 display type in the Related Content Section 906 of a user interface. The Related Tags 904 display type displays category options with text. Categories presumed to be more relevant to the user may be emphasized by ordering the tags displayed with the Related Tags 904 display type.

Although the description has been described with respect to particular embodiments thereof, these particular embodiments are merely illustrative, and not restrictive.

Figure 10:
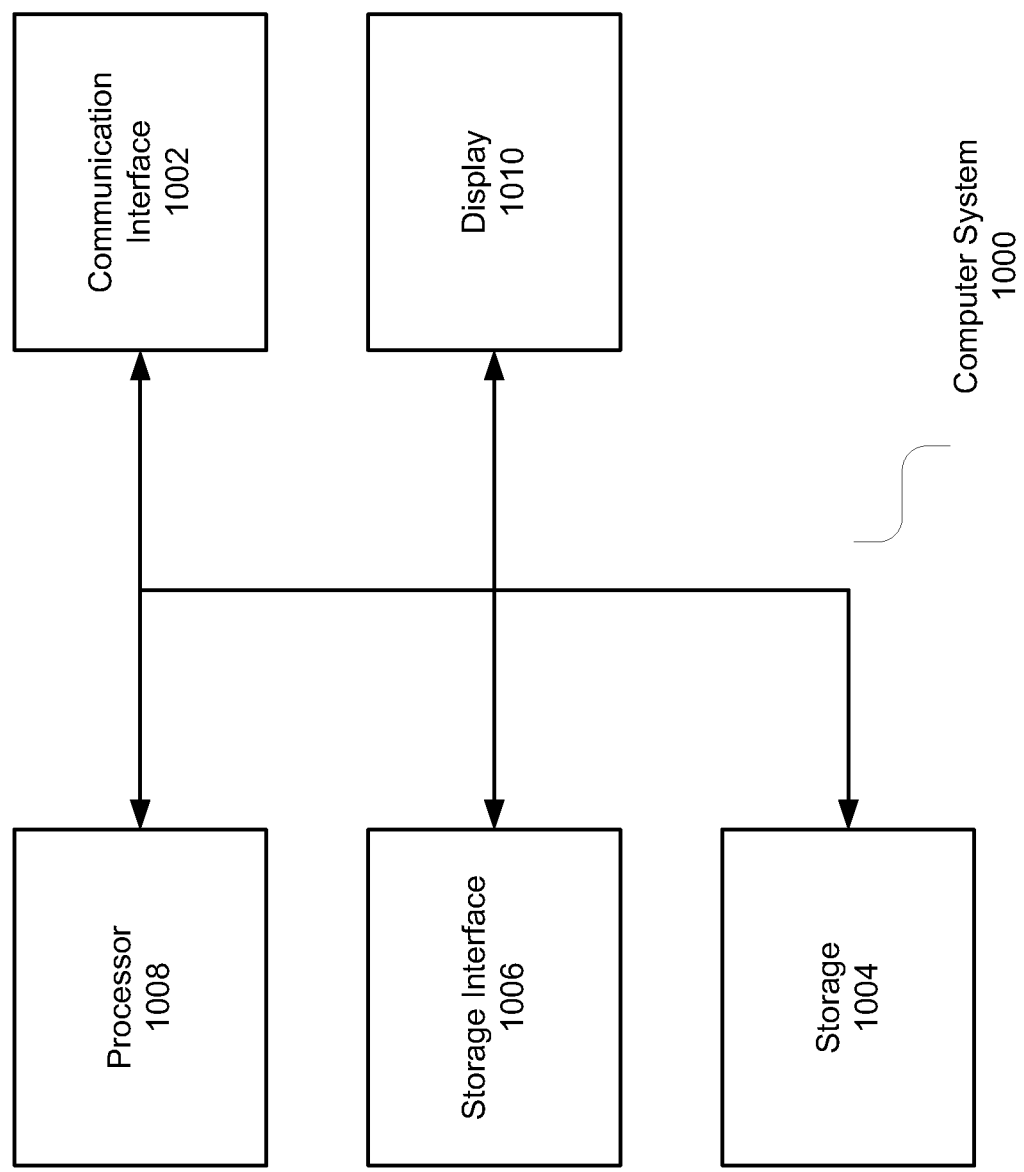
FIG. 10 depicts a block diagram of an example of an architecture for a computer system.

FIG. 10 depicts a block diagram for an example of an architecture for a computer system. The execution of instructions to practice the invention may be performed by any number of computer systems 1000 as depicted in FIG. 10. As used herein, the term computer system is broadly used to describe any computing device that can store and independently run one or more programs, applications, scripts, or software processes. Implementations of the present invention may have a single computer system 1000 or any number of computer systems 1000.

Computer systems 1000 may communicate with other computer systems/devices using any number of Communication Interface(s) 1002. The Communication Interface 1002 may provide the ability to transmit and receive signals, such as electrical, electromagnetic or optical signals, that include data streams representing various types of information (e.g., messages, communications, instructions, and data). The Communication Interface 1002 may provide an implementation for a communication protocol, such as a network protocol. Instructions may be executed by a Processor 1008 upon receipt and/or stored in Storage 1004 accessible to the Computer System 1000.

Storage 1004 may be accessed by the Computer System 1000 with a Storage Interface 1006. The Computer System 1000 may use the Storage Interface 1006 to communicate with the Storage 1004. The Storage Interface 1006 may include a bus coupled to the storage and able to transmit and receive signals. Storage 1004 may include random access memory (RAM) or other dynamic storage devices, for storing dynamic data and instructions executed by the Processor

1008. Any number of Processor(s) 1008 may be used to execute instructions for the Computer System 1000. Storage may include, but is not limited to, read only memory (ROM), magnetic disks, flash drives, usb drives, and optical disks. In one or more embodiments, a Computer System 1000 may be connected to a Display 1010 for displaying information to a user.

"Computer usable medium" or "Computer-readable medium" refers to any medium that provides information or may be used by a Processor 1008. Mediums may include volatile and non-volatile storage mediums.

Various embodiments of the present invention may be implemented with the aid of computer-implemented processes or methods (e.g. programs or routines) that may be rendered in any computer language including, without limitation, C#, C/C++, Fortran, COBOL, PASCAL, Ruby, Python, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

In view of the above, it should be appreciated that some portions of this detailed description are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Various general-purpose systems may be used with programs in accordance with the teachings herein, or it may prove convenient to construct more specialized apparatus to perform the required method. For example, any of the methods according to the present invention can be implemented in hard-wired circuitry by programming a general-purpose processor or by any combination of hardware and software. One of ordinary skill in the art will immediately appreciate that the invention can be practiced with computer system configurations other than those described, including hand-held devices, multiprocessor systems, microprocessor-based or programmable consumer electronics. DSP devices, minicomputers, mainframe computers, and the like. The invention can also be practiced in distributed computing environments where tasks are performed by remote processing devices that are linked through a communications network.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art. The previous detailed description is of a small number of embodiments for implementing the invention and is not intended to be limiting in scope. One of skill in this art will immediately envisage the methods and variations used to implement this invention in other areas than those described in detail.

The following claims set forth a number of the embodiments of the invention disclosed with greater particularity. Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for a user interface of a content integration framework, comprising:
   receiving information on a tile size for a matrix of evenly spaced tiles, wherein the matrix comprises one or more tiles with the tile size displayed on a user interface;
   receiving one or more content images for display on the user interface;
   determining a position within a first tile of the matrix for rendering a first content image from the one or more content images;
   determining a first area of excess space within the tile after positioning the first content image within the first tile, wherein the first area of excess space is dependent on at least one of an aspect ratio of the first content image and a size of the first content image;
   rendering a reflection of the first content image within at least a portion of the first area of excess space within the first tile, wherein said reflection ensures improved uniformity and consistency of the user interface;
   rendering the first content image within the first tile of the matrix;
   and
   displaying descriptive text associated with the first content image so that the descriptive text overlays the reflection and not the first content image.

2. The method of claim 1, the method further comprising:
   receiving a second content image from one or more content images for display on the user interface, wherein the second content image differs from the first content image in at least one of an aspect ratio and an image size;
   determining a position within a second tile of the matrix for rendering a second content image from the one or more content images;
   determining a second area of excess space within the second tile after positioning the second content image within the tile, wherein the first area of excess space differs from the second area of excess space;
   rendering a reflection of the second content image within at least a portion of the second area of excess space within the second tile; and
   rendering the second content image within the second tile of the matrix.

3. The method of claim 2, wherein the position within the first tile of the matrix is the same as the position within the second tile of the matrix.

4. The method of claim 1, the method further comprising:
   receiving one or more inputted terms; and
   displaying a tile display user interface with content images from one or more content providers in response to receipt of the one or more inputted terms.

5. The method of claim 1, wherein the first content image is a still content image from a video file.

6. The method of claim 1, the method further comprising:
   determining optimization available for the first content image in accordance with at least one of the aspect ratio of the first content image and the size of the first content image; and
   optimizing the first content image by at least one of resizing the first content image, altering the aspect ratio for the first content image, changing a format of a file comprising the first content image, and changing a compression method for the file comprising the first content image.

7. The method of claim 1, the method further comprising:
   rendering the reflection of the first content image and the first content image within the first tile; and
   providing the first tile to the user interface for display.

8. A non-transitory computer-readable storage medium having one or more instructions thereon for a content integration framework, the instructions when executed by one or more processors causing the one or more processors to carry out:
   receiving information on a tile size for a matrix of evenly spaced tiles, wherein the matrix comprises one or more tiles with the tile size displayed on a user interface;
   receiving one or more content images for display on the user interface;
   determining a position within a first tile of the matrix for rendering a first content image from the one or more content images;
   determining a first area of excess space within the tile after positioning the first content image within the first tile, wherein the first area of excess space is dependent on at least one of an aspect ratio of the first content image and a size of the first content image;
   rendering a reflection of the first content image within at least a portion of the first area of excess space within the first tile, wherein said reflection ensures improved uniformity and consistency of the user interface;
   rendering the at least one content image within the first tile of the matrix;
   and
   displaying descriptive text associated with the first content image so that the descriptive text overlays the reflection and not the first content image.

9. The non-transitory computer-readable storage medium of claim 8, the instructions further comprising:
   receiving a second content image from one or more content images for display on the user interface, wherein the second content image differs from the first content image in at least one of an aspect ratio and an image size;

determining a position within a second tile of the matrix for rendering a second content image from the one or more content images;

determining a second area of excess space within the second tile after positioning the second content image within the tile, wherein the first area of excess space differs from the second area of excess space;

rendering a reflection of the second content image within at least a portion of the second area of excess space within the second tile; and rendering the second content image within the second tile of the matrix.

10. The non-transitory computer-readable storage medium of claim 9, wherein the position within the first tile of the matrix is the same as the position within the second tile of the matrix.

11. The non-transitory computer-readable storage medium of claim 8, the instructions further comprising:

receiving one or more inputted terms; and displaying a tile display user interface with content images from one or more content providers in response to receipt of the one or more inputted terms.

12. The non-transitory computer-readable storage medium of claim 8, wherein the first content image is a still content image from a video file.

13. The non-transitory computer-readable storage medium of claim 8, the instructions further comprising:

determining optimization available for the first content image in accordance with at least one of the aspect ratio of the first content image and the size of the first content image; and optimizing the first content image by at least one of resizing the first content image, altering the aspect ratio for the first content image, changing a format of a file comprising the first content image, and changing a compression method for the file comprising the first content image.

14. A system for providing a user interface for a content integration framework, comprising:

a processor operable to execute a set of instructions; and a computer readable medium in communication with the processor, the computer readable medium operable to store a set of instructions, wherein the set of instructions are configured to:

receiving information on a tile size for a matrix of evenly spaced tiles, wherein the matrix comprises one or more tiles with the tile size displayed on a user interface;

receiving one or more content images for display on the user interface;

determining a position within a first tile of the matrix for rendering a first content image from the one or more content images;

determining a first area of excess space within the tile after positioning the first content image within the first tile, wherein the first area of excess space is dependent on at least one of an aspect ratio of the first content image and a size of the first content image;

rendering a reflection of the first content image within at least a portion of the first area of excess space within the first tile, wherein said reflection ensures improved uniformity and consistency of the user interface;

rendering the at least one content image within the first tile of the matrix; and displaying descriptive text associated with the first content image so that the descriptive text overlays the reflection and not the first content image.

15. The system of claim 14, the instructions further configured to: receiving a second content image from one or more content images for display on the user interface, wherein the second content image differs from the first content image in at least one of an aspect ratio and an image size;

determining a position within a second tile of the matrix for rendering a second content image from the one or more content images;

determining a second area of excess space within the second tile after positioning the second content image within the tile, wherein the first area of excess space differs from the second area of excess space;

rendering a reflection of the second content image within at least a portion of the second area of excess space within the second tile; and rendering the second content image within the second tile of the matrix.

16. The system of claim 15, the instructions further configured to:

wherein the position within the first tile of the matrix is the same as the position within the second tile of the matrix.

17. The system of claim 14, the instructions further configured to: receiving one or more inputted terms; and displaying a tile display user interface with content images from one or more content providers in response to receipt of the one or more inputted terms.

18. The system of claim 14, wherein the first content image is a still content image from a video file.

19. The system of claim 14, the instructions further comprising:

determining optimization available for the first content image in accordance with at least one of the aspect ratio of the first content image and the size of the first content image; and optimizing the first content image by at least one of resizing the first content image, altering the aspect ratio for the first content image, changing a format of a file comprising the first content image, and changing a compression method for the file comprising the first content image.

20. The system of claim 14, the instructions further comprising:

rendering the reflection of the first content image and the first content image within the first tile; and providing the first tile to the user interface for display.

* * * * *